(12) United States Patent
Rudolf et al.

(10) Patent No.: US 6,922,406 B2
(45) Date of Patent: Jul. 26, 2005

(54) METHOD OF SYNCHRONIZING BASE STATIONS

(75) Inventors: Marian Rudolf, Rennes (FR); Bruno Jechoux, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/962,271

(22) Filed: Sep. 26, 2001

(65) Prior Publication Data

US 2002/0039906 A1 Apr. 4, 2002

(30) Foreign Application Priority Data

Oct. 3, 2000 (FR) .......................................... 00 12765

(51) Int. Cl.⁷ .............................................. H04J 13/00
(52) U.S. Cl. ..................................... 370/350; 714/783
(58) Field of Search ................................. 370/208, 277, 370/280, 294, 342, 345, 347, 350, 441, 442, 479, 522; 714/752, 755, 775, 781, 783

(56) References Cited

U.S. PATENT DOCUMENTS

| | | | |
|---|---|---|---|
| 5,566,172 A | * | 10/1996 | Mourot ........................ 370/347 |
| 6,141,373 A | * | 10/2000 | Scott ........................... 375/150 |

FOREIGN PATENT DOCUMENTS

| | | |
|---|---|---|
| EP | 0 892 504 A2 | 1/1999 |
| WO | WO 00/14915 | 3/2000 |
| WO | WO 00/54424 | 9/2000 |

OTHER PUBLICATIONS

Braun, V., "On Higher Order Autocorrelation Properties of Golay Complementary Sequences", Jun. 29, 1997, Information Theory. 1997. Proceedings., 1997 IEEE International Symposium, p. 16.*
Budisin, S. Z., "New Complementary Pairs of Sequences", Jun. 21, 1990, IEEE Electronics Letters, vol. 26, No. 13, pp. 881–883.*

(Continued)

*Primary Examiner*—Huy D. Vu
*Assistant Examiner*—Justin M Philpott
(74) *Attorney, Agent, or Firm*—Oblon, Spivak, McClelland, Maier & Neustadt, P.C.

(57) ABSTRACT

Method of synchronizing base stations in a mobile radio telecommunication system, characterized in that a first base station transmits a synchronisation sequence having a first sequence followed by a second sequence, the said first and second sequences being obtained from polyphase complementary sequences and in that at least one second base station effects the correlation of the said synchronization sequence with a replica of the first sequence and a replica of the second sequence, the correlation results then being added in order to provide synchronization information.

8 Claims, 4 Drawing Sheets

OTHER PUBLICATIONS

Running et al., "A Method of Designing Pulse Compression Code Using Orthogonal Properties of Polyphase Code Matrix", 1990, Singapore ICCS/ISITA '92. 'Communications on the Move', vol. 1, pp. 406–409.*

B. M. Popovic, Electronics Letters, vol. 35, No. 17, pps. 1427–1428, "Efficient Golay Correlator," Aug. 19, 199.

Ericsson, pps. 1–8, "New Rach Preambles with Low Auto--Correlation Sidelobes and Reduced Detector Complexity," Mar. 22–26, 1999.

3GPP TS 25.223 V3.7.0 (Sep.–2001)., 3rd Generation Partnership Project; Technical Specification Group Radio Access Network; Spreading and modulation (TDD) (Release 1999).

C. Tellambura et al., IEEE Communication Letters, vol. 2, no. 5, pp. 140–142, "Channel Estimation Using Aperiodic Binary Sequences", May 1998.

P. Spasojevic et al., IEEE Internation Symposium on Information Theory, p. 55, "ISI Channel Estimation Using Complementary Sequences", Jun. 25–30, 2000.

P. Spasojevic et al., IEEE Transactions on Information Theory vol. 47, no. 3, pp. 1145–1152, "Complementary Sequences for ISI Channel Estimation ", Mar. 2001.

P. Spasojevic, pp. 1–176, "Sequence and Channel Estimation for Channels with Memory", Dec. 1999.

3GPP TSG RAN WG1#16, XP–002215817, Mitsubishi Electric: "Sequences for the Node B synchronisation burst", pp. 1–6; Oct. 10–13, 2000.

TSGR1#3(99)205, XP002901242, Ericsson "New RACH preambles with low auto–correlation sidelobes and reduced detector complexity", pp. 1–8; Mar. 22–26, 1999.

* cited by examiner

METHOD OF SYNCHRONIZING BASE STATIONS

BACKGROUND OF THE INVENTION

1. Field of the Invention

The present invention concerns a method of synchronising base stations in a mobile radio telecommunication system. More particularly, the present invention concerns a method of synchronising base stations for a telecommunication system of the time division duplex (TDD) type. The said telecommunication system is for example the system for which a standard is at present being drawn up, normally referred to as 3GPP W-CDMA TDD.

2. Discussion of the Background

FIG. 1 depicts a radio frame of such a telecommunication system. It consists of fifteen time slots, some of which, for example the slots $IT_0$, $IT_1$, $IT_2$, $IT_5$, $IT_6$ and $IT_8$, are intended for conveying data (in the broad sense of the term) in the downlink direction (base station to mobile terminal) whilst others, the slots $IT_3$, $IT_4$, $IT_7$, $IT_9$, $IT_{10}$, $IT_{11}$, $IT_{12}$, $IT_{13}$ and $IT_{14}$, are intended for conveying data in the uplink direction (mobile station to base station). During a transmission slot, the data (D) are transmitted in the form of a sequence of symbols. The slot also includes a midamble (M) comprising pilot symbols enabling the channel to be estimated, a power control word (TPC) and a guard period (GP'). In such a system, several mobile terminals or base stations can transmit or receive data in the same time slot. The connections are differentiated by code division multiplexing (Code Division Multiple Access=CDMA). The symbols transmitted by or for the different users are spectrally spread, approximately at a "chip" frequency $1/T_c$ where Tc is the elementary transmission period.

Because the same frequency can be used both in the uplink direction and in the downlink direction, it is essential to ensure synchronisation of the base stations. This is because, if such were not the case, a first mobile terminal transmitting at high power in an uplink channel could interfere with a second mobile channel, close to the first, receiving data over a downlink channel. The synchronisation constraint between adjacent base stations is around a few microseconds (approximately 5) in the W-CDMA TDD system.

To effect synchronisation between base stations, several methods have been proposed in the state of the art. According to a first method, the synchronisation is achieved by virtue of GPS receivers equipping the base stations. According to a second method, first of all, in an initial phase, for example during the phase of setting up the network or a new base station, an approximate synchronisation is carried out (of around a few tens of ms, that is to say a few tens of thousands of "chips"). This rough initial synchronisation is provided by the network, or more precisely by the radio access controller (RNC) controlling several adjacent base stations (also referred to as "B nodes"). A fine synchronisation is then effected regularly by the radio interface between adjacent base stations. The purpose of this fine synchronisation is notably to correct any difference in the sequencing clocks between adjacent base stations. To do this, certain time slots are reserved for the transmission and reception of a synchronisation signal. A time slot dedicated to synchronisation comprises essentially a synchronisation sequence (Sync) and a guard period (GP). Synchronisation is obtained, in a manner known per se, by correlation of the received sequence with a sequence which is a replica of the one transmitted. The correlation is effected on a time window with a length given by the margin of accuracy of the approximate synchronisation. Thus, when a base station receives a synchronisation sequence and detects a correlation peak in this window, it can synchronise its sequencing with that of the adjoining base stations.

The synchronisation sequence generally used is lengthy (a few thousands of "chips") in order to obtain good accuracy of correlation for an acceptable power per symbol. The guard period must be greater than the propagation time from a base station to an adjacent station so as to avoid, on reception, an encroachment of the synchronisation sequence on an adjacent time slot. The distance between two base stations being greater than the radius of a cell, the guard period (GP) is chosen so as to be greater than the normal guard period (GP'). The guard period (GP) must also take account of the difference between the frame clocks.

The synchronisation sequence is chosen so as to have good autocorrelation properties, namely a very pronounced autocorrelation peak. Generally the synchronisation sequences used are obtained from primitive polynomials on GF(2), a Galois field of cardinal 2. Such a sequence has a length L which is an $N^{th}$ power of 2 minus 1, that is to say $L=2^N-1$. This is the case notably for so-called Gold sequences proposed in the report TSGR1#15(00)0946 entitled "Sequences for the cell sync burst" of the Working Group TSG-RAN of the ETSI for synchronising adjacent base stations.

Gold sequences have good periodic autocorrelation properties (the correlation of a sequence consisting of the repetition of a Gold sequence with a replica of the sequence of the latter does not have significant secondary peaks). On the other hand, these sequences unfortunately do not have such good aperiodic autocorrelation properties (correlation of an isolated Gold sequence with a replica). What is more, the correlator generally used operates in the time domain in the form of a conventional adapted FIR filter having a complexity in terms of O(L) which can be very high. In addition, the choice of the lengths of such sequences is reduced, since they can, as has been seen, take only values $2^N-1$ and a truncation would lead to a substantial loss of autocorrelation properties.

SUMMARY OF THE INVENTION

One purpose of the present invention is to propose a method of synchronising adjacent base stations by virtue of the transmission of a correlation sequence having very good autocorrelation properties and a wide choice of possible lengths, and this for a low degree of complexity of the correlator.

The present invention is defined by a method of synchronising base stations in a mobile radio telecommunication system in which a first base station transmits a synchronisation sequence having a first sequence followed by a second sequence, the said first and second sequences being obtained from polyphase complementary sequences, and at least one second base station effects the correlation of the said synchronisation sequence with a replica of the first sequence and a replica of the second sequence, the correlation results then being added in order to provide synchronisation information.

Advantageously, the first and second sequences are Golay complementary sequences.

According to a first embodiment, the said synchronisation sequence comprises guard times around the first and second sequences.

According to a second embodiment, the said synchronisation sequence comprises a periodic extension of the first sequence followed by a periodic extension of the second sequence.

According to a third embodiment, the first sequence is generated by means of a first Golay sequence and a first ancillary sequence by successively multiplying the said first Golay sequence by the bits of the first ancillary sequence.

Likewise, the second sequence can be generated by means of a second Golay sequence, complementary to the said first Golay sequence, and a second auxiliary sequence by successively multiplying the said second Golay sequence by the bits of the second ancillary sequence.

Advantageously, the first ancillary sequence and the second ancillary sequence are Golay complementary sequences.

According to a variant embodiment, the correlation is effected by a trellis filtering.

BRIEF DESCRIPTION OF DRAWINGS

The characteristics of the invention mentioned above, as well as others, will emerge more clearly from a reading of the following description given in relation to the accompanying figures, amongst which.

DETAILED DESCRIPTION

The general idea at the basis of the invention is to use, for synchronising adjacent base stations, a pair of complementary polyphase codes and more particularly a pair of Golay complementary codes. In the remainder of the description, mention will be made not of polyphase codes but of Golay codes. It is clear, however, that the invention applies to polyphase codes in general.

These complementary codes, known as such, have the remarkable property that the sum of their aperiodic autocorrelation functions is a Dirac function. In other words, if a pair of such complementary codes is denoted (A,B), this gives a $\phi_{AA}(m)+\phi_{BB}(m)=\delta(m)$ where m is the time index, $\delta$ the Kronecker symbol, and $\phi$ the aperiodic autocorrelation function.

In addition, as described notably in the article by S. Z. Budisin, entitled "Efficient pulse compressor for Golay complementary sequences", published in Electronics Letters, Vol. 27, N° 3, pages 219–220 in January 1991, the correlator can be produced by virtue of a trellis filter having a complexity in terms of O(log L) rather than in terms of O(L) as in a conventional adapted FIR filter. This trellis filter is also referred to as an EGC filter, standing for Efficient Golay Correlator. An example of an embodiment of an EGC filter is given in the article by B. M. Popovic entitled "Efficient Golay Correlator", published in IEEE Electronics Letters, Vol. 35, N° 17, January 1999.

In addition, for a given authorised length, there are several possible Golay sequences. This is because, Golay sequences being generated by generator codes, it can be shown that two distinct generator codes with the same length generate Golay sequences which are also distinct and have the same length.

These sequences have good intercorrelation properties (that is to say low intercorrelation values), enabling, for example, groups of base stations to use distinct codes or again to effect a synchronisation of the base stations at different times of their sequencing.

Figure 1:
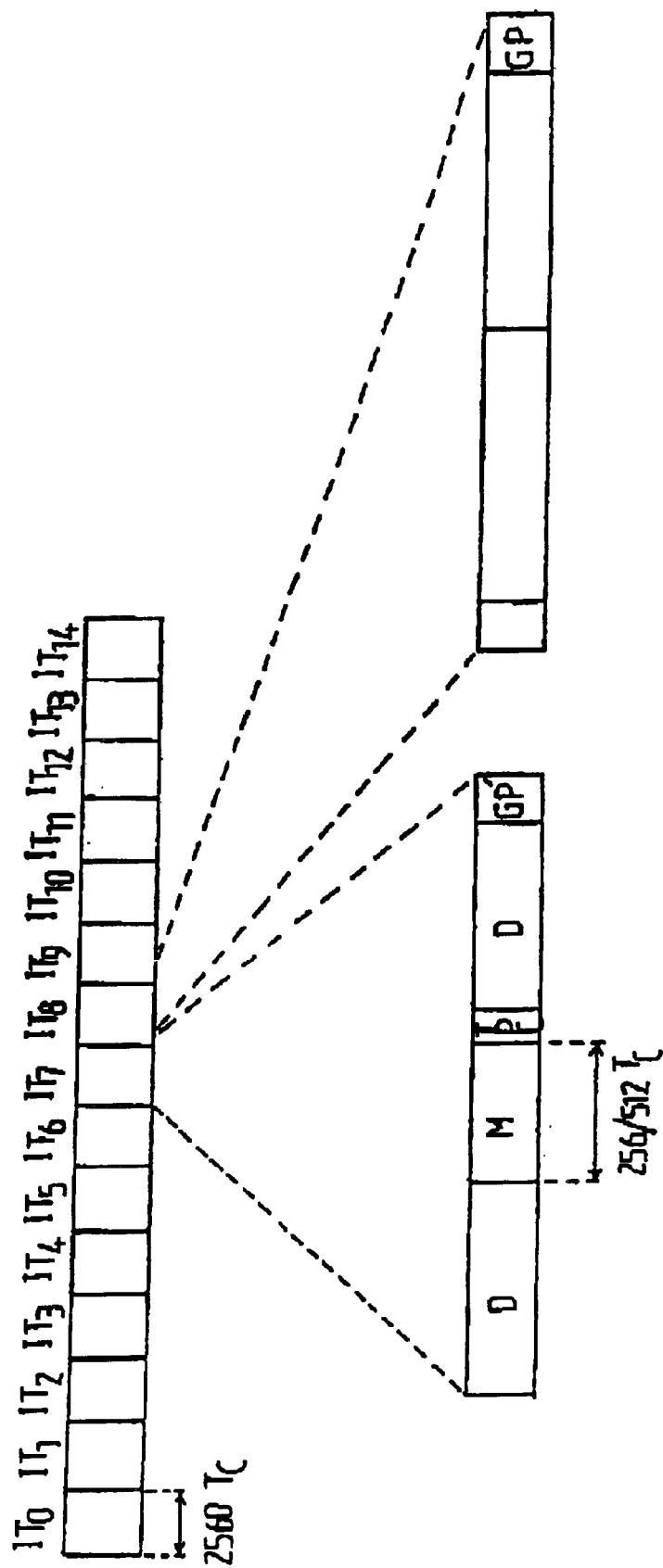
FIG. 1 depicts schematically a transmission frame of a transmission system of the W-CDMA TDD type.
Figure 2A:
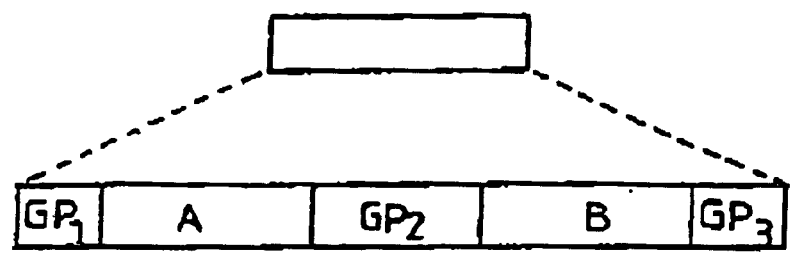
FIG. 2A depicts a first embodiment of the invention.

A first embodiment of the invention is illustrated in FIG. 2A. According to this embodiment, a synchronisation sequence consists of two Golay complementary sequences A and B multiplexed in time, each sequence being preceded and followed by a guard time, as described in the French application FR-A-9916851 filed on Dec. 30, 1999 in the name of the applicant. This sequence is transmitted by a base station and is received by an adjacent base station. On reception, the synchronisation sequence is correlated with a replica of the sequence A and a replica of the sequence B, and the result of correlation with the sequence A is delayed so as to be aligned in time with the result of correlation with the sequence B before they are added, the Dirac peak being obtained when the replicas of A and B are aligned with the corresponding sequences. The presence of the guard times $GP_1$, $GP_2$ and $GP_3$ ensures that, at the time of correlation, the sequences A and B do not overlap the corresponding complementary replicas, namely B and A respectively, in a time window centred on the time alignment position. Thus secondary correlation peaks can result from the intercorrelation between sequences and complementary replicas are ejected out of this window. More precisely, if $GP_2=2.GP_3=2.GP_1=2.GP$, the sum of the two correlation results has an isolated Dirac peak in a window of width 2.GP around the time alignment position. The correlations are advantageously effected by EGC correlators, as mentioned above.

Figure 2B:
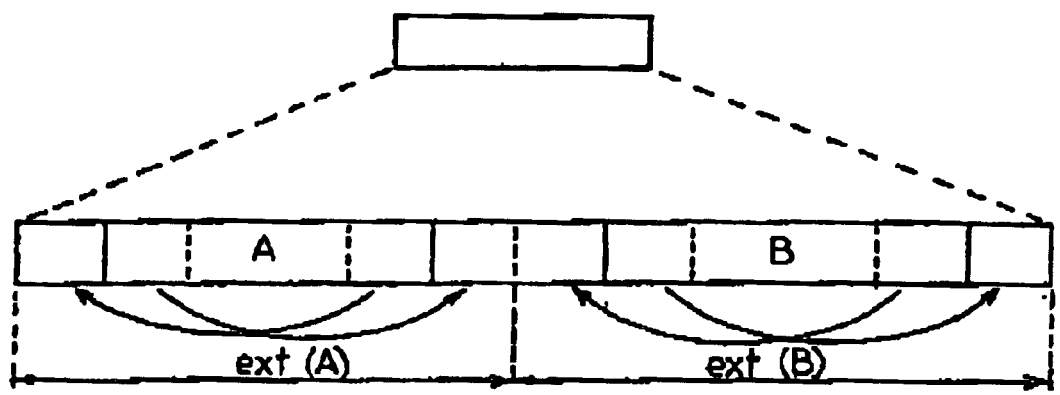
FIG. 2B depicts a second embodiment of the invention.

A second embodiment of the invention is illustrated in FIG. 2B. According to this embodiment, a synchronisation sequence consists of two Golay complementary sequences multiplexed in time, each sequence being preceded and followed by a periodic extension, as explained in the French application entitled "Channel estimation sequence and method of estimating a transmission channel using such a sequence" filed in the name of the applicant. The periodic extension of a given sequence is a truncation of the periodic sequence obtained by repetition of the said sequence. To do this, it suffices to concatenate with the sequence to be extended a prefix corresponding to the end and a suffix corresponding to the start of the said sequence. FIG. 2B indicates schematically the concatenation of prefixes and suffixes for two Golay complementary sequences A and B. The synchronisation sequence itself consists of two sequences thus extended ext(A) and ext(B). The periodic extensions produce the same advantages as the guard times, namely the absence of secondary correlation peaks around the Dirac peak in a certain time window. More precisely, if the suffixes and prefixes are of identical size and equal to E, the sum of the correlation results will have an isolated Dirac peak in a window of width 2.E around the time alignment position. This will easily be understood if the case is considered where the synchronisation sequence comprises completely periodised sequences A and B. The correlation with replicas of A and B then produces a series of Dirac peaks of period L. A periodic extension of size E amounts to truncating this series by a window of width 2.E around the time alignment peak. The advantage of this embodiment compared with the previous one is not to cause abrupt variations in signal power between the sequences A and B, at the transmitter amplifier. Such abrupt variations may generate high frequencies and intersymbol interference and consequently degrade the correlation results on reception.

Figure 2C:
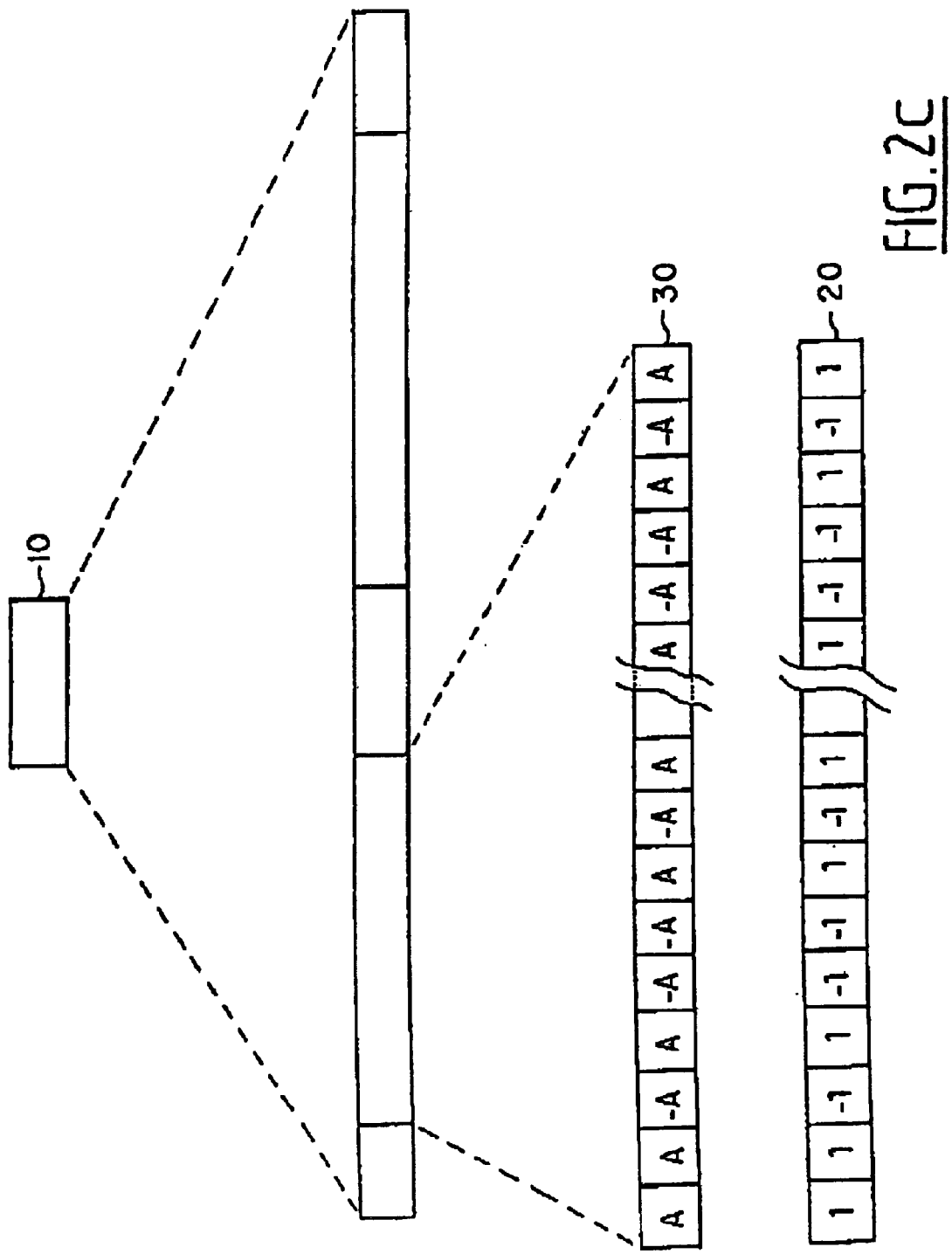
FIG. 2C depicts a third embodiment of the invention.

A third embodiment of the invention is illustrated in FIG. 2C. According to this embodiment, a composite sequence

(10) is generated from a Golay code sequence A or B and an ancillary sequence X (20), according to the mode of constructing the hierarchical sequences. More precisely, the first bit of he ancillary sequence X (20) is multiplied successively by all the bits of the sequence A, and then the second bit of the second sequence by all the bits of the sequence A, and so on, and he sequences obtained are concatenated. Such a composite sequence will be noted below A*X (30), A being the base sequence and X being the generator ancillary sequence (20). The Golay complementary sequences A and B can thus be multiplied by ancillary sequences X, Y, identical or distinct, the latter also being able themselves to be Golay sequences.

Let A*X and B*X be composite sequences obtained from a pair A, B of Golay complementary sequences, of length L, extended by prefixes and suffixes of size E. A*X and B*X are multiplexed in time and separated by an interval W. The signal received is correlated with the sequence A on the one hand and with the sequence B on the other hand. The result of the first correlation is delayed by (L+2E)+W and is summed with the result of the second correlation. The sum obtained is a sequence R having a series of Dirac peaks of period L'=L+2E modulated by the values $x_0, x_1, \ldots, x_K$ where K is the length of the sequence X, each peak being surrounded by a window of width 2.E containing only zeros. The sequence R is then subjected to a filtering by means of a linear response filter:

$$H(z) = x_0 + x_1 \cdot z^{-L'} + \ldots + x_K \cdot z^{-K \cdot L'}$$

The filtered sequence R includes a Dirac peak of height 2.K.L in the middle of a zero window of width 2.E which makes it possible to detect it easily. In addition, the total sequence consisting of the sequences A*X and B*X multiplexed in time is of total length 2.(L+2.E).K+W, which offers a wide choice of lengths of permitted sequences.

According to another variant embodiment, four composite sequences A*X, A*Y, B*X, B*Y are generated, where A, B form a first pair of Golay complementary sequences, extended or not, and X, Y form a second pair of Golay complementary sequences serving as generator ancillary sequences.

The composite sequences are multiplexed in time and separated by intervals which will be assumed to be equal and of width W. The sequences A and B are of length L'=L+2.E where L is the length of the basic sequence and E the size of the extension, the sequences X, Y being of length K. The total sequence length is therefore 4(L+2E)K+3W, which offers a wide choice of permitted sequence lengths.

Figure 3:
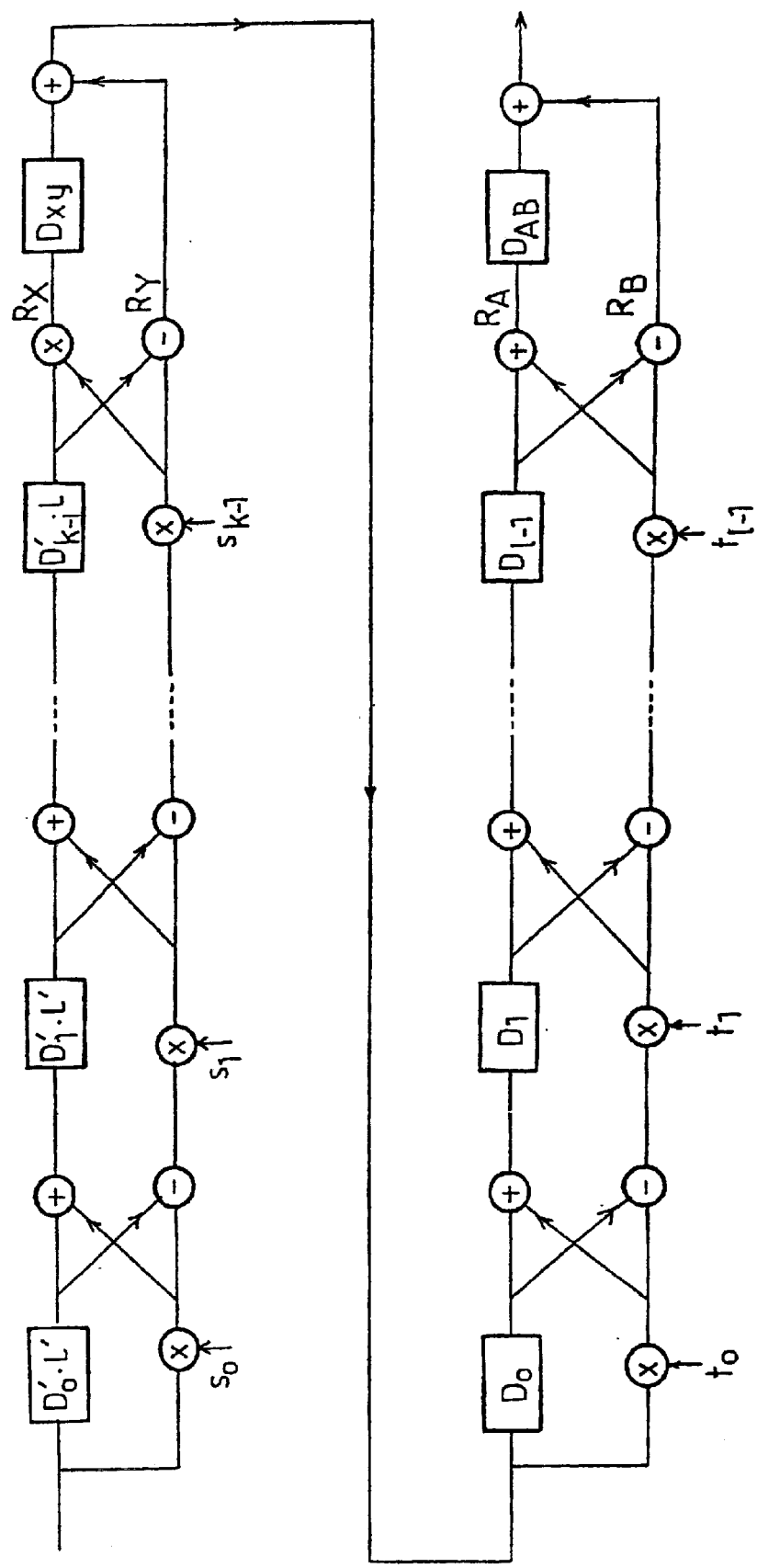
FIG. 3 depicts a correlator useful to the third embodiment of the invention.

The present variant takes advantage of the fact that there are L' pairs of complementary sequences (X,Y) in the form of sub-sequences $S_m$ and $S'_m$ with $S_m(n)=(A*X)_{n.L'+m}$ and $S'_m(n)=(B*X)_{n.L'+m}$, $m=0, \ldots, L'-1$ obtained by decimation of the initial total sequence. Instead of effecting a correlation with an EGC correlator, a "hierarchical" correlator is used, the first stage of the EGC function correlator modified as depicted in FIG. 3.

It will be assumed that the pair of sequences X and Y has been generated conventionally by an elementary sequence $s_0, \ldots, s_{k-1}$, where $K=2^k-1$, and delays $D'_0, D'_1, \ldots, D'_{k-1}$ with $D'_i=2^{Pi}$ where $(P_0, P_1, \ldots, P_{k-1})$ is a permutation on the set $(0, 1, \ldots, k-1)$, recursively as follows:

$$X_0(i) = \delta(i);\ Y_0(i) = \delta(i);$$

$$X_n(i) = X_{n-1}(i) + S_{n-1} \cdot X_{n-1}(i - D'_i);\ Y_n(i) = Y_{n-1}(i) - S_{n-1} \cdot Y_{n-1}(i - D'_i);$$

Likewise, it will be assumed that the pair of sequences A, B was generated by the elementary sequence $t_0, \ldots, t_{l-1}$, where $L = 2^l - 1$, and delays $D_0, D_1, \ldots, D_{k-1}$ with $D_i = 2^{Pi}$ where $(P_0, P_1, \ldots, P_{l-1})$ is a permutation on the set $(0, 1, \ldots, l-1)$.

The first correlation stage effects a correlation with the pair of sequences X, Y, but differs from a conventional EGC correlator in that the delays have been multiplied by a factor L' in order to take account of the scattering in the samples. The two correlation results are added after time alignment by a delay $D_{XY}$, the delay $D_{XY}$ separating the sequences A*X and A*Y, on the one hand, the sequences B*X and B*Y, on the other hand. The second stage of the correlator effects the correlation with the pair of sequences A, B and is conventional per se. The correlation results are aligned in time by a delay $D_{AB}$ and added, the delay $D_{AB}$ corresponding to the difference in time between the sequences A*X and B*X on the one hand and the sequences A*Y and B*Y on the other hand.

The correlator thus formed first of all effects a rough correlation with a step L' and then a fine correlation to the sampling step. Its complexity is low since the number of operations performed is in O(log(K)+log(L)).

Although the example described above has only two sequence levels and two correlation levels, the invention can be extended in an immediate manner to any number of levels of sequences and corresponding stages of the hierarchical correlator.

What is claimed is:

1. A method of synchronizing base stations in a mobile radio telecommunication system, comprising:

transmitting from a first base station a synchronization sequence comprising a first polyphase sequence of length L and a second polyphase sequence of length L following said first polyphase sequence, said second polyphase sequence complementary to said first polyphase sequence and directly connected to said first polyphase sequence by at least one of a periodic extension of length less than L of said first polyphase sequence and a periodic extension of length less than L of said second polyphase sequence;

receiving said synchronization sequence at a second base station;

correlating the synchronization sequence received at said second base station with at least a portion of the first polyphase sequence and at least a portion of the second polyphase sequence so as to produce a first correlation result and a second correlation result, respectively; and adding said first correlation result and said second correlation result, wherein said periodic extensions of said first and second polyphase sequences are replicas of a part of the respective first and second polyphase sequences.

2. The method according to claim 1, wherein said first polyphase sequence comprises a first Golay sequence and said second polyphase sequence comprises a second Golay sequence which is complementary to said first Golay sequence.

3. The method according to claim 1, wherein said periodic extension of said first polyphase sequence consists of:

a beginning part of said first polyphase sequence which is concatenated with a trailing edge of said first polyphase sequence and a leading edge of said second polyphase sequence.

4. The method according to claim 1, wherein said periodic extension of said second polyphase sequence consists of:

an ending part of said second polyphase sequence which is concatenated with a trailing edge of said first polyphase sequence and a leading edge of said second polyphase sequence.

5. The method according to claim 1, wherein said periodic extension of said first polyphase sequence and said second polyphase sequence respectively consist of:
   a beginning part of said first polyphase sequence which is concatenated with a trailing edge of said fist polyphase sequence, and
   an ending part of said second polyphase sequence which is concatenated with a trailing edge of said periodic extension of said first polyphase sequence and a leading edge of said second polyphase sequence.

6. A method of synchronizing base stations in a mobile radio telecommunication system, comprising:
   transmitting from a first base station a synchronization sequence comprising a first sequence consisting of a first Golay code of length L and a periodic extension of the first Golay code of length less than L and a second sequence concatenated with said first sequence and consisting of a second Golay code of length L, complermentary to the first Golay code of length L, wherein said periodic extension of said first Golay code is positioned between the first Golay code and the second Golay code;
   receiving said synchronization sequence at a second base station;
   correlating the synchronization sequence received at said second base station with at least a portion of the first Golay code and at least a portion of the second Golay code so as to produce a first correlation result and a second correlation result, respectively; and
   adding said first correlation result and said second correlation result, wherein
   said periodic extension of said first Golay code is a replica of a part of the first Golay code.

7. A method of synchronizing base stations in a mobile radio telecommunication system, comprising:
   transmitting from a first base station a synchronization sequence comprising a first sequence consisting of a first Golay code of length L and a second sequence concatenated with said first sequence and consisting of a second Golay code of length L, complementary to the first Golay code of length L, and a periodic extension of the second Golay code of length less than L, wherein said periodic extension of said second Golay code is positioned between the first Golay code and the second Golay code;
   receiving said synchronization sequence at a second base station;
   correlating the synchronization sequence received at said second base station with at least a portion of the first Golay code and at least a portion of the second Golay code so as to produce a first correlation result and a second correlation result, respectively; and
   adding said first correlation result and said second correlation result, wherein
   said periodic extension of said second Golay code is replica of a part of the second Golay code.

8. A method of synchronizing base stations in a mobile radio telecommunication system, comprising:
   transmitting from a first base station a synchronization sequence comprising a first sequence consisting of a first Golay code of length L and a periodic extension of the first Golay code of length less than L and a second sequence concatenated with said first sequence and consisting of a second Golay code of length L, complementary to the first Golay code of length L, and a periodic extension of the second Golay code of length less than L, wherein said periodic extension of said first Golay code and said periodic extension of the second Golay code are positioned between the first Golay code and the second Golay code;
   receiving said synchronization sequence at a second base station;
   correlating the synchronization sequence received at said second base station with at least a portion of the first Golay code and at least a portion of the second Golay code so as to produce a first correlation result and a second correlation result, respectively; and
   adding said first correlation result and said second correlation result, wherein
   said periodic extension of said first Golay code and said periodic extension of said second Golay code are replicas of a part of the respective first and second Golay codes.

* * * * *